United States Patent [19]

Shephard

[11] 4,010,526
[45] Mar. 8, 1977

[54] CUT-OFF TOOL

[75] Inventor: Donald L. Shephard, Memphis, Mich.

[73] Assignee: Helen I. Shepherd, Memphis, Mich.; a part interest

[22] Filed: Jan. 12, 1976

[21] Appl. No.: 648,071

[52] U.S. Cl. .................................................. 29/96
[51] Int. Cl.[2] ........................................ B26D 1/00
[58] Field of Search .......... 29/96, 95 R; 76/101 A, 76/112

[56] References Cited

UNITED STATES PATENTS

| | | | |
|---|---|---|---|
| 1,396,180 | 11/1921 | Fors | 29/96 |
| 3,205,558 | 9/1965 | Stier | 29/96 |
| 3,416,209 | 12/1968 | Contrucci et al. | 29/96 |
| 3,561,086 | 2/1971 | Milewski et al. | 29/96 |
| 3,599,303 | 8/1971 | Sletten | 29/96 |
| 3,795,959 | 3/1974 | Shepard | 29/96 |

FOREIGN PATENTS OR APPLICATIONS 572,723  5/1945  United Kingdom .............. 76/101 A Primary Examiner—Leonidas Vlachos
Attorney, Agent, or Firm—Cullen, Settle, Sloman & Cantor

[57] ABSTRACT

A cut off tool comprises an elongated support blade of uniform thickness adapted for mounting in a tool holder and having a head projecting above said blade at one end thereof. An elongated carbide insert having an undercut slot is mounted over the top of said head and is adapted for securing thereon. The insert is of uniform cross section having side walls which taper downwardly and inwardly, end walls which taper downwardly and inwardly and a top surface which is transversely concave along its length to define with an end face a concave leading cutting edge. An elongated lock body is loosely mounted upon and along the support blade and includes at one end a locking head defining a chip breaker and carbide insert lock. The body is notched at its forward end defining with said lock head a hold down part which overlies and retainingly engages said insert. The lock body is adapted for mounting within said tool holder which includes a hold down clamp which retainingly engages said lock body causing its head to secure the insert upon said blade head.

6 Claims, 6 Drawing Figures

CUT-OFF TOOL

BACKGROUND OF THE INVENTION

Heretofore within said conventional tool holders there have been removably mounted an elongated cut-off blade of uniform thickness and which has along its top edge an enlarged head which is normally concave along its top surface throughout its length and whose side walls are tapered downwardly and inwardly. The leading edge of the blade including the head is cut downwardly and rearewardly to define with said head an irregularly shaped cutting edge. From time to time as this cutting edge wears, the blade itself is ground in planes parallel to its initial downwardly and rearwardly inclined edge to thus provide in said head a new cutting edge. This process can be repeated from time to time, regrinding the blade so as to provide new cutting edges.

SUMMARY OF THE INVENTION

It is an object of the present invention to provide an improved cut-off tool adapted for mounting within a tool holder and wherein, it no longer becomes necessary to regrind the leading edge in order to provide a new cutting surface. Instead, there is provided a support blade mountable within the tool holder having an upright head at its forward end and removably mounted thereon is a throw away replaceable carbide insert. Said carbide insert has its sides cut downwardly and inwardly and its top surface concave along its length and with its end faces cut downwardly and inwardly so as to provide at its opposite ends separately usable cutting edges. When one edge is worn, the insert is readjusted end to end and remounted upon the support blade.

It is another object to provide an improved hold down and anchoring means for the removable throw-away carbide insert.

These and other objects will be seen from the following specification and Claims in conjunction with the appended drawing.

THE DRAWING

Figure 1:
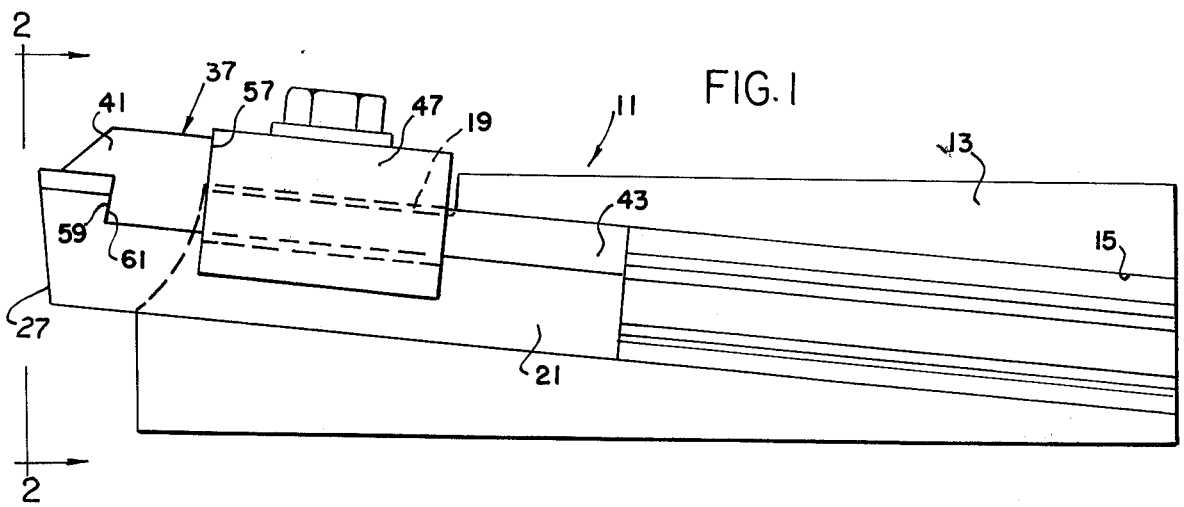
FIG. 1 is a side elevational view of the present cut-off tool mounted within a tool holder and clamped thereon.

It will be understood that the above drawing illustrates merely a preferred embodiment of the invention, and that other embodiments are contemplated within the scope of the Claims hereafter set forth.

DETAILED DESCRIPTION OF THE INVENTION

Referring to the drawing, the present clamp lock holder with throw away tip and chip breaker if generally indicated at 11 and includes the elongated holder 13 of rectangular shape in cross section.

The holder is of a conventional construction and includes along one side thereof the lateral slot 15 having a pair of vertically spaced elongated stop ridges 17. The holder is cut away down to slot 15 for receiving clamp 47 hereafter described.

Elongated support blade 21 is of uniform thickness and includes a pair of parallel sides 23 and has at one end thereof the head 25 which projects above said blade.

The forward end face of the blade end head is cut away downwardly at 27 and rearwardly to provide a clearance angle. The cutting part of the tool includes an elongated carbide insert 29 which could be constructed of high speed steel, and which has upon its undersurface the elongated undercut slot 31 adapted to cooperatively receive the top edge of head 25.

Figure 4:
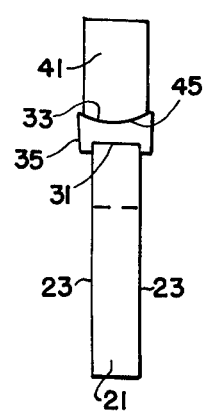
FIG. 4 is an end view thereof.

The top surface of the insert as best shown in FIG. 4 is transversely concave as at 33 or hollow ground.

Figure 3:
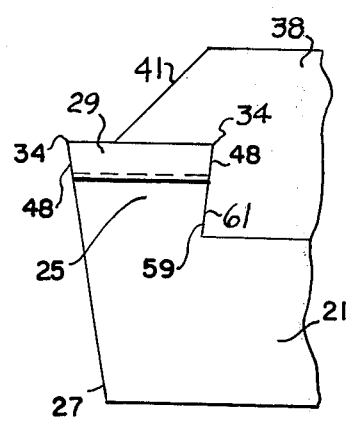
FIG. 3 is a fragmentary side elevational view of the forward end of the present combination chip breaker and carbide lock, insert and support blade on an increased scale.
Figure 6:
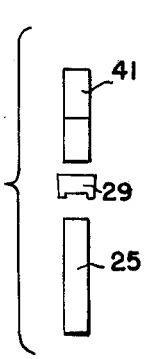
FIG. 6 is an end view thereof.
Figure 5:
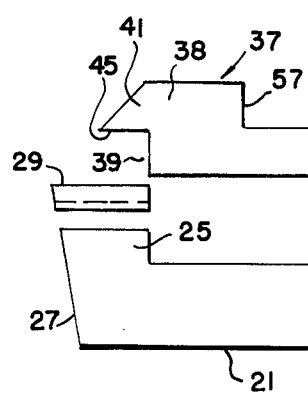
FIG. 5 is an exploded view of the present carbide support, carbide insert and chip breaker and carbide lock shown assembled in FIGS. 1 and 3.

As shown in FIG. 3, the forward end face of the carbide insert is cut downwardly and rearwardly and defines with the forward end portion of the insert the transverse cutting edge 34 which extends across the top of said insert.

The opposite sides of said insert are tapered downwardly and inwardly at 35 to provide a clearance angle when the carbide insert and its supporting blade are transversely projected into a workpiece for cut-off or grooving purposes.

In order to anchor and to hold down said insert upon head 25, there is provided a combination chip breaker and insert lock 37. The chip breaker and insert lock includes the head 38 which forms a part of and projects from the elongated lock body or shank 43 at one end thereof. The forward end of said head is notched at 39 to define the hold down 41 which, as shown in FIGS. 1 and 2, is adapted to operatively and retainingly bear against the insert 29 for holding it in the assembled position upon the support head 25.

The hold down 41 upon its undersurface is convex as at 45 for cooperative reatinging registry with the concave hollow ground top channel 33 of said insert.

Figure 2:
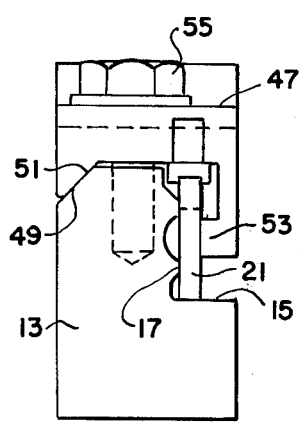
FIG. 2 is a left end elevational view thereof taken in the direction of arrows 2—2 of FIG. 1.

The height of the undersurface 45 of said hold down with respect to the bottom edge of the body 43 is such that upon assembly, FIG. 1, the hold down 41 will retainingly bear against the insert when clamped into position. However, the undersurface of the lock body 43 will only loosely bear against the top surface of blade 21 for proper clamping action.

As seen in FIG. 3, when the insert 29 is assembled upon the support head 25 on blade 21, its opposite end surfaces 48 are tapered downwardly and inwardly.

Forward edge face 48 is coplaner with the clearance angle defining forward edge face of the blade and its head 21, 25.

Accordingly, both of the edge faces 48 at opposite ends of the insert define with the top of concave surface 33 the transverse cutting edge 34 at opposite ends of said insert.

Accordingly in use when the cutting edge 34 at one end of said insert has become worn, with the clamp loosened, the insert may be reversed end to end to provide a new cutting edge.

Clamp 47 is of a conventional construction for use in conjunction with the tool holder 13.

Along one edge, as shown in FIG. 2, there is provided a lock ridge taper 49 upon its undersurface adapted for cooperative registry with the taper edge 51 of the tool holder.

Its opposite side includes the downwardly extending and inwardly directed support retainer 53 to operatively and retainingly engage the blade 21 holding it snugly against the ridges 17 within the tool holder blade slot 15.

Bolt 55 extends down through said clamp and threadedly engages the tool holder body so that said clamp overlies and retainingly engages the combination chip breaker and carbide lock which, in turn, bears upon and along the top surface of the blade 21.

The rear upright edge 57 of the lock head 38 bears up against clamp 47 when secured to further retain the combination chip breaker and carbide lock against relative longitudinal movement and particularly, with respect to the support blade 21 and its head 25.

The forward edge 59 adjacent the lock head 38 and defined by the notch 39 is adapted to cooperatively register with a corresponding stop 61 at the rear of the blade head 25. This provides a cooperative interlock between the carbide lock and the blade support 21.

By the present construction, there is provided a short carbide insert which serves as the cutting tool and which is relatively inexpensive. When dull, the insert may be reversed end to end and a fresh cutting edge employed. The chip breaker clamp including the lock head 38 and the elongated body 43 are more or less permanent and need not be replaced.

Having described my invention, reference should now be had to the following Claims.

I claim:

1. A cut off tool comprising an elongated support blade of uniform thickness adapted for mounting in a tool holder;
   a support head on and projecting above said blade at its forward end;
   an elongated carbide insert of U shape in cross section wider than said support head and having an undercut slot mounted on and along the length of said head, with said head snugly extending into said slot, and said insert adapted for securing thereon, both lower edges of said insert bearing against side portions of said head;
   said insert being of uniform cross section, having side walls tapering downwardly and inwardly;
   its opposite end faces tapering downwardly and inwardly, its top surface being transversely concave along its length to define with an end face a concave leading cutting edge;
   said insert top edge being hollow ground;
   said insert after wear of its cutting edge, adapted for reversal end to end upon said head to provide a second cutting edge;
   the leading edge face of said support blade being cut downwardly and rearwardly and coplaner with said insert leading edge face;
   and means removably securing said insert upon said head.

2. A cut off tool comprising an elongated support blade of unifrom thickness adapted for mounting in a tool holder;
   a support head on and projecting above said blade at its forward end; and
   an elongated carbide insert having an undercut slot mounted on and along the length of said head, with said head snugly extending into said slot, and adapted for securing thereon;
   said insert being of uniform cross section, having side walls tapering downwardly and inwardly; its opposite end faces tapering downwardly and inwardly, its top surface being transversely concave along its length to define with an end face a concave leading cutting edge;
   means removably securing said insert upon said head;
   said securing means including an elongated lock body loosely mounted upon and along said support blade;
   a lock head on and projecting above said body at its forward end defining a chip breaker and carbide lock;
   said body being notched at its forward end defining with said lock head a hold down part overlying and retainingly engaging said insert;
   said lock body adapted for mounting within said tool holder;
   a hold down clamp mounted on and secured to said tool holder, overlying and bearing against said lock body; and
   a portion of said clamp bearing against one end of said locking head retaining it against reward movement relative to said tool holder.

3. In the cut off tool of claim 2, the undersurface of said lock head being convex for cooperative registry within the concave top of said insert.

4. In combination, an elongated tool holder having a laterally opening slot on one side, its forward top edge having a cut away portion extending to said slot;
   a cut off tool comprising an elongated upright support blade of uniform thickness nested within said slot and bearing against said tool holder, with one end projecting forwardly of said tool holder;
   a support head on and projecting above said blade at its forward end;
   an elongated carbide insert having an undercut slot mounted on and along the length of said head, with said head snugly extending into said slot;
   an elongated lock body loosely mounted upon and along said support blade;
   a head on and projecting above said body at its forward end defining a chip breaker and carbide lock;
   said body being notched at its forward end defining with said lock head a hold down part overlying and retainingly engaging said insert;
   said lock body being nested within the tool holder slot; and
   a hold down clamp mounted within said tool holder cut away portion and secured to said tool holder, overlying and retainingly bearing against said lock body, a portion of said clamp bearing against one end of said locking head retaining it against rearward movement relative to said tool holder.

5. In the cut off tool of claim 4, said insert being of uniform cross section, having side walls tapering downwardly and inwardly; its opposite end faces tapering downwardly and inwardly; its top surface being transversely concave along its length to define with an end face a concave leading cutting edge.

6. In the cut off tool of claim 5, said insert after wear of its cutting edge, adapted for reversal end to end upon said head to provide a second cutting edge.

* * * * *